(12) United States Patent
Mizia et al.

(10) Patent No.: US 6,384,178 B2
(45) Date of Patent: May 7, 2002

(54) PROCESS FOR THE PREPARATION OF POLYCARBONATE DIOLS WITH A HIGH MOLECULAR WEIGHT

(75) Inventors: Franco Mizia; Franco Rivetti, both of Milan (IT)

(73) Assignee: Enichem S.p.A., San Donato Milanese (IT)

( * ) Notice: Subject to any disclaimer, the term of this patent is extended or adjusted under 35 U.S.C. 154(b) by 0 days.

(21) Appl. No.: 09/797,593

(22) Filed: Mar. 5, 2001

(30) Foreign Application Priority Data

Mar. 16, 2000 (IT) .......................................... MI00A0549

(51) Int. Cl.⁷ .............................................. C08G 64/00
(52) U.S. Cl. ....................... 528/196; 528/198; 264/165; 264/176.1; 428/64
(58) Field of Search ................................ 528/196, 198; 428/64; 264/165, 176.1

(56) References Cited

FOREIGN PATENT DOCUMENTS

| EP | 0 496 204 A | 12/1992 |
| EP | 0 754 714 A | 1/1997 |
| EP | 0 798 328 A | 10/1997 |

*Primary Examiner*—Terressa M. Boykin
(74) *Attorney, Agent, or Firm*—Oblon, Spivak, McClelland, Maier & Neustadt, P.C.

(57) ABSTRACT

A process is described for the preparation of polycarbonate dials (PCD) with a high molecular weight comprising two subsequent reaction steps, wherein in the first step PCD with a molecular weight ranging from 500 to 2000, is synthesized and in the second step the molecular weight of the PCD is increased to the desired value. Polycarbonate diols are usefully applied in the field of thermoelastomeric polyurethane manufactured products, paints, adhesives and synthetic leather.

27 Claims, No Drawings

PROCESS FOR THE PREPARATION OF POLYCARBONATE DIOLS WITH A HIGH MOLECULAR WEIGHT

The present invention relates to a process for the preparation of polycarbonate diols (PCD) with a high molecular weight comprising two subsequent reaction steps wherein in the first step PCD with a molecular weight ranging from 500 to 2000, is synthesized and in the second step the molecular weight of the PCD is increased to the desired value.

Polycarbonate diols are a group of oligomeric polyols which are used in the synthesis of prepolymers with an isocyanate functionality useful in the production of thermoelastomeric polyurethanes which are used for the preparation of paints, adhesives and seals.

In particular, PCD with a high molecular weight, i.e. higher than 2000, can be used in formulations for the production of polyurethane adhesives of the reactive hot-melt type (HMR moisture curing), as well as in polymerization processes in emulsion, as for example in the production of synthetic leather, where they increase the coagulation rate of the polyurethane obtained with a consequent improvement in the tear strength.

The preparation of polycarbonate diols by the carbonylation of an aliphatic glycol with a carbonylating agent, optionally in the presence of suitable catalysts, is known in the art.

For example patents U.S. Pat. Nos. 2,789,964 and 3,000,849 describe the use of alkyl carbonates as carbonylating agents. Operating according to these processes, however, it is difficult to obtain PCD with a correct hydroxyl functionality. The problem is particularly significant in the case of the synthesis of PCD with a high molecular weight, for example higher than 2000 (referring to the number average).

A second method is based on the use of aromatic carbonates (U.S. Pat. No. 3,544,524) whose considerable reactivity allows the transesterification reaction to be carried out without catalysts. This process produces PCD with a high molecular weight and with a correct hydroxyl functionality. The high molecular mass of the aromatic carbonate used as carbonylating agent, however, reduces the space yield of reactors and implies the production of a stream of phenol distillate whose entity makes the process of little economic interest.

Another method comprises the use of phosgene (U.S. Pat. No. 4,533,729), a toxic chemical reagent which can be synthesized and used only in appropriate industrial areas. The high acidity, moreover, jeopardizes the quality of the PCD obtained, necessitating the use of acid receptors to control it.

A simple and economic process has now been found for the preparation of polycarbonate diols with a high molecular weight and with a correct hydroxyl functionality which overcomes the drawbacks of the known art described above.

In accordance with this, an objective of the present invention relates to a process for the production of polycarbonate diols with a molecular weight higher than 2000 having general formula (I)

$$HO—R'—[OCOOR']_n—OH \qquad (I)$$

wherein: n is an integer or decimal ranging from 5 to 40 and R' is a bivalent alkylene radical deriving from a diol by the loss of two hydroxyls, said process comprising:

(a) a first reaction step wherein a polycarbonate diol is prepared with a molecular weight ranging from 500 to 2000, having general formula (II)

$$HO—R'—[OCOOR']_{n'}—OH \qquad (II)$$

wherein n' is an integer or decimal<n and ranging from 2 to 20 and R' has the meaning defined above, by reacting an alkyl carbonate having formula (III)

$$RO—CO—OR \qquad (III)$$

wherein R is a $C_1$–$C_4$ alkyl radical with a linear or branched chain, with an aliphatic diol having formula (IV)

$$HO—R'—OH \qquad (IV)$$

wherein R' has the meaning defined above, in the presence of a transesterification catalyst, eliminating the alcohol from the reaction mixture; and (b) a second step wherein the mixture containing the compound having formula (II) obtained in the first step is reacted with an aryl carbonate ArO—CO—OAr (V).

Step a

In this step the diol (IV) and the carbonate (III) are reacted, in the presence of a transesterification catalyst, according to the following scheme (i)

$$n'RO—CO—OR+(n'+1)\,HO—R'—OH \rightarrow HO—R'—[OCOOR']_{n'}—OH+2n'R—OH \qquad (i)$$

wherein R, R' and n' have the meaning defined above.

The diol (IV) and the carbonate (III) are used in a molar ratio ranging from 2/1 to 1.05/1, preferably from 1.2/1 to 1.07/1.

In the compounds have formula (I), R' is selected from:

1. linear or branched alkylene radicals or cycloalkylene radicals containing from 3 to 14 carbon atoms; said radicals may optionally have one or more substituents which do not interfere with the transesterification reaction.

2. bivalent radicals deriving from polyether dials having formula (V):

$$HO—[(CHR)_d—O]_x—H \qquad (V)$$

wherein: d is a number which can vary from 2 to 4, x can vary from 1 to 25 and R can be H and/or $CH_3$.

3. bivalent radicals deriving from polyester dials having formula (VI)

$$HO—[(CHR'')_f—COO—(CH_2)_g—O]_y—H \qquad (VI)$$

deriving from the condensation of a lactone with a linear aliphatic diol and wherein f is a number ranging from 3 to 6, g is a number ranging from 3 to 14, y is a number ranging from 1 to 10 and R'' can be H and/or $CH_3$.

4. a mixture of two or more bivalent radicals selected from those listed under points 1–3.

Examples of R' radicals are those deriving from the following diols: 1,6-hexanediol (HD), 1,3-propanediol, 1,4-butanediol, 2,2-dimethyl-1,3-propanediol, 1,5-pentanediol, 1,4-bis(hydroxymethyl-cyclohexane), diethyleneglycol (DEG), triethylene glycol (TEG), polyethyleneglycol (PEG/Mn 200–400), dipropylene glycol (DPG), poly-propylene glycol (PPG/Mn 200–400), polytetramethyleneglycol (PTMEG/Mn 250), the diol deriving from the condensation of caprolactone with 1,6-hexanediol. 1,6-hexanediol is preferred.

Examples of R radicals are those deriving from the following carbonates: dimethyl carbonate (DMDC), diethyl carbonate (DEC), dipropyl carbonate (dnpc), diisopropyl carbonate (dipc), dibutylcarbonate (dnbc), diisobutylcarbonate (dibc). Dimethyl carbonate is preferred.

Transesterification catalysts suitable for the purpose generally consist of organometallic compounds based on metals of group IV B in the tetravalent state such as titanium, zirconium and tin. Compounds of titanium and tin are preferred.

Examples of titanium compounds are tetra alcoholates of ethyl, propyl, isopropyl, butyl, iso-octyl and phenyl.

Examples of tin compounds are dibutyl tin di-laurate, dibutyl tin octoate and tin oxalate.

The quantity of catalyst used, referring to the metal which forms the active center, generally ranges from 1 to 1000 mg/kg of diol, preferably from 5 to 100 mg/kg.

The reaction is carried out at a temperature ranging from 150 to 200° C. and under boiling conditions at the operating pressure, the alcohol R—OH co-produced by the transesterification being removed as it is formed.

Temperatures lower than the first limit indicated can be used but are not advantageous as the reaction rate is too low, whereas temperatures higher than the second limit favour secondary reactions such as the formation of ether bridges by the decarboxylation of the carbonate bridges in the polymeric chain, or, in relation to the structure of the monomeric diol, the elimination of cyclic ethers deriving from the same monomeric diol.

Temperatures ranging from 180 to 195° C. are preferably used.

The pressure at which the reaction is carried out depends on the vapor pressure of the reaction mixture at the temperature indicated for the reaction and, in any case, is such as to allow the removal by boiling of the alcohol co-produced by the transesterification.

If DMC is used, the methanol is removed in the form of an azeotropic mixture with the carbonate itself. In this case, an additional quantity of DMC equal to that removed by distillation with the methanol, is added to the quantity of DMC put into the reaction with the purpose of reacting with the diol.

The pressure adopted when DMC is used generally ranges from 1 to 5 bars.

The reaction is carried out for such times as to effect the complete conversion of the dialkyl carbonate and generally ranging from 1 to 12 hours.

The transesterification reaction can be carried out batchwise or in semi-continuous, i.e. by progressively feeding the dialkyl carbonate to the reactor under regime conditions, as it is used up by the reaction. This operating procedure allows the reaction to be carried out at a lower pressure than that required by the operation effected batchwise.

Subsequently, by maintaining the synthesis temperature within the pre-selected values and progressively reducing the pressure of the system to a value ranging from 1 to 200 mbars, preferably from 10 to 100 mbars, the conversion of the residual alkylcarbonic terminations in the PCD (II) is made quantitative by their reaction with the hydroxide terminations with a consequent further release of the alcohol produced in accordance with the following reaction (ii):

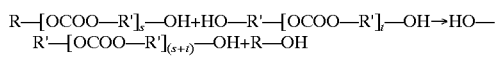

wherein: (s+t)=n' in formula (II) and R and R' have the meaning defined above.

This second phase of step a) is carried out within a period of time ranging from 1 to 20 hours, preferably from 3 to 10 hours. In this way PCD (II) is obtained with a hydroxide functionality equal to 2 and whose molecular weight is a function of the diol/di-alkyl carbonate ratio used.

The reaction can be carried out in a reactor equipped with a rectification column for the removal of the ROH alcohol co-produced. During the second phase it is preferable to exclude the column and directly connect the reactor to a condenser situated downstream of the column, where there is a vacuum regulation system.

Step b)

The reaction mixture coming from the first step, which contains PCD (II) and the catalyst, is reacted with the aryl carbonate (V) according to the following scheme (iii):

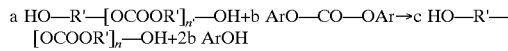

wherein: n>n' and c<a; R' has the meaning defined above and Ar is an aromatic radical selected from those deriving from the following carbonates: diphenylcarbonate (DPC), dinitrophenylcarbonate and dichlorophenylcarbonate. Diphenyl carbonate is preferred.

A molar ratio between PCD (II) and diaryl carbonate ranging from 1.1/1 and 6/1 is used, at a temperature ranging from 120 to 150° C., preferably from 130 to 140° C.

Temperatures lower than the first limit indicated are not advantageous due to a reaction rate which is too low and also to the high viscosity which the reaction mass would obtain with an increase in the molecular weight of the PCD with consequent mechanical difficulties.

Temperatures higher than the second limit are undesired as they favor colouring of the product.

The reaction is carried out batchwise by feeding the aryl carbonate to the PCD (II) mass pre-charged into the reactor maintained under stirring and then brought to the pre-selected temperature conditions. The operating pressure is not particularly critical, as boiling conditions are not adopted and is preferably atmospheric pressure.

The reaction times are such as to obtain the complete conversion of the aryl carbonate and, however, generally range from 1 to 10 hours, typically from 2 to 4 hours.

Subsequently, by maintaining the synthesis temperature and progressively reducing the pressure of the system to values ranging from 1 to 200 mbars, preferably from 10 to 100 mbars, the ArOH co-produced is removed from the reaction mixture and at the same time the conversion of the residual arylcarbonic terminations in the PCD (I) is made quantitative, by their reaction with the hydroxide terminations with the consequent release of further ArOH according to the following reaction (iv):

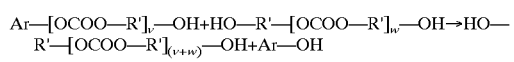

wherein: (v+w)=n in formula (I).

Operating under the conditions described above, the transesterification is completed in a period of time ranging from 1 to 20 hours, preferably from 3 to 10 hours, to obtain PCD (I) with a hydroxide functionality equal to 2 and whose molecular weight, which is in relation to the PCD(II)/aryl carbonate ratio used, is higher than. 2000, generally ranging from 2500 to 5000.

The process of the present invention allows PCD (I) to be obtained with a high molecular weight optimizing the space yield of the reactor and economy of the transesterification process.

The following examples should be considered as being illustrative but non-limiting of the present invention. In the examples, a three-liter jacketed flask is used, equipped with a stirrer, drip funnel, thermometer and plate by distillation column (20 nominal steps) having a sampling head in liquid phase (L/D) regulated by means of a valve temporized in order to control the reflux ratio. The heating system consists of an oil bath.

EXAMPLE 1

A) 1681.5 g (14.25 moles) of 1,6-hexanediol and 119.35 mg (0.42 mmoles) of titanium tetra-isopropylate are charged in the molten state into the flask, inertized with nitrogen.

The flask is heated to an internal temperature of 190° C. at atmospheric pressure and 1372 g (15.24 moles) of dimethyl carbonate are then gradually fed through the drip funnel.

A total aliquot of DMC is fed which is such as to make the reaction mixture, maintained at 190° C., boil, the column being kept at total reflux until the temperature at the head of the column is equal to 65° C., corresponding to that of the azeotropic mixture of methanol/DMC (70/30 by weight) at atmospheric pressure.

At this point the azeotropic mixture produced is removed and DMC is fed, regulating the feeding flow-rate so as to maintain the temperature of the reaction mixture and the head of the column at the respective values indicated above.

At the end of the addition of DMC the synthesis temperature is gradually raised to 195° C., the distillation being continued until the rise in temperature at the head of the column indicates the exhaustion of methanol production.

During this phase about 80% of the overall methanol co-produced by the transesterification (784 g) is collected. The phase requires about 6 hours for completion.

The final part of the reaction is carried out by progressively reducing the pressure to 25 mbars and maintaining the synthesis temperature at 195° C. In this way the transformation of the residual alkylcarbonic terminations is completed, by stripping the methanol generated from the reaction mixture. 2000 g of PCD are obtained with a number average molecular weight Mn equal to 1000.

B) The equipment used in step A) is used, excluding the rectification column and directly connecting the reaction flask to a condenser conditioned at 42° C.

The mixture coming from step A) is cooled to 135° C. and, maintaining it under stirring at atmospheric pressure, 283 g (1.32 moles) of diphenylcarbonate (DPC) melted at 81° C. are fed. The resulting mixture is kept under these conditions for at least 2 hours to obtain the complete conversion of the DPC. The phenol formed is then removed, by slowly reducing the pressure of the system to a minimum value of 25 mbars.

A total of 248.5 g (2.64 moles) of phenol are stripped and 2034 g (0.67 moles) of PCD are obtained with a molecular weight equal to 3000.

1.0 kg of PCD was therefore obtained starting from 1.64 kg of reagents.

EXAMPLE 2

Comparative

The direct preparation of a polycarbonate diol having a molecular weight Mn of 3000 is effected starting from 1,6-hexanediol (HD) and DPC.

1681.5 g (14.25 moles) of HD are fed in the molten state to the equipment described above, and are heated to the melting point of DPC (81° C.).

2906 g (13.57 moles) of DPC in the molten state are subsequently fed. The reactor is heated to an internal temperature of 190° C. at atmospheric pressure and the mixture is left under stirring for at least 2 hours. The phenol formed is then distilled, by reducing the pressure of the system to a minimum value of 25 mbars.

A total of 2553 g (27.17 moles) of phenol are removed and 2034 g of PCD are obtained with a molecular weight Mn equal to 3000.

1.0 kg of PCD was therefore obtained starting from 2.26 kg of reagents.

What is claimed is:

1. A process for the preparation of a polycarbonate diol with a number average molecular weight higher than 2000 of formula (I)

$$HO\text{---}R'\text{---}[OCOOR']_n\text{---}OH \quad (I)$$

wherein: n is an integer or decimal forom 5 to 40 and R' is a bivalent alkylene radical derived from a diol by the loss of two hydroxyls, said process comprising:

(a) reacting an alkyl carbonate of formula (III)

$$RO\text{---}CO\text{---}OR \quad (III)$$

wherein R is a $C_1$–$C_4$ alkyl radical with a linear or branched chain, with an aliphatic diol of formula (IV)

$$HO\text{---}R'\text{---}OH \quad (IV)$$

wherein R' has the meaning defined above, in the presence of a transesterification catalyst, eliminating the alcohol from the reaction mixture to produce a polycarbonate diol with a number average molecular weight from 500 to 2000, of formula (II)

$$HO\text{---}R'\text{---}[OCOOR']_{n'}\text{---}OH \quad (II)$$

wherein n' is an integer or decimal<n and from 2 to 20 and R' has the meaning defined above; and (b) reacting the mixture containing said polycarbonate diol of formula (II) with an aryl carbonate of formula (V)

$$ArO\text{---}CO\text{---}OAr \quad (V).$$

2. The process according to claim 1, wherein in the compound of formula (I), R' is selected from the group consisting of:

linear or branched alkylene radicals or cycloalkylene radicals containing from 3 to 14 carbon atoms; said radicals may optionally have one or more substituents which do not interfere with the transesterification reaction, bivalent radicals derived from polyether diols having formula (VI):

$$HO\text{---}[(CHR)_d\text{---}O]_x\text{---}H \quad (VI)$$

wherein: d is a number from 2 to 4, x is a number from 1 to 25 and R is H and/or $CH_3$, bivalent radicals derived from polyester diols having formula (VII)

$$HO\text{---}[(CHR")_f\text{---}COO\text{---}(CH_2)_g\text{---}O]_y\text{---}H \quad (VII)$$

derived from the condensation of a lactone with a linear aliphatic diol and wherein f is a number from 3 to 6, g is a number from 3 to 14, y is a number from 1 to 10 and R" is H and/or $CH_3$, and mixtures thereof.

3. The process according to claim 2, wherein the radical R' is derived from diols selected from the group consisting of 1,6-hexanediol, 1,3-propanediol, 1,4-butanediol, 2,2-dimethyl-1,3-propanediol; 1,5-pentanediol, 1,4-bis (hydroxymethylcyclohexane), diethyleneglycol, triethylene glycol, polyethyleneglycol, dipropylene glycol, poly-propylene glycol, polytetramethyleneglycol, and the diol derived from the condensation of caprolactone with 1,6-hexanediol.

4. The process according to claim 3, wherein R' is derived from 1,6-hexanediol.

5. The process according to claim 1, wherein the radical R is derived from carbonates selected from the group consisting of dimethyl carbonate, diethyl carbonate, dipropyl carbonate, diisopropyl carbonate, dibutylcarbonate, diisobutylcarbonate.

6. The process according to claim 5, wherein R is derived from dimethyl carbonate.

7. The process according to claim 1, wherein in the compound of formula (V), Ar is derived from an aromatic radical selected from the group consisting of diphenylcarbonate, dinitrophenylcarbonate and dichlorophenylcarbonate.

8. The process according to claim 7, wherein Ar is derived from diphenyl carbonate.

9. The process according to claim 1, wherein in step (a) the diol (IV) and the carbonate (II) are used in a molar ratio from 2/1 to 1.05/1.

10. The process according to claim 1, wherein in step (a) the diol (IV) and the carbonate (III) are used in a molar ratio from 1.2/1 to 1.07/1.

11. The process according to claim 1, wherein in step (b) a molar ratio between said polycarbonate diol of formula (II) and said aryl carbonate of formula (V) from 1.1/1 to 6/1, is used.

12. The process according to claim 1, wherein in step (a) the transesterification catalyst is selected from the group consisting of organometallic compounds based on metals of group IV in the tetravalent state.

13. The process according to claim 12, wherein the catalyst is selected from the group consisting of compounds of titanium and tin.

14. The process according to claim 13, which comprises titanium compounds selected from the group consisting of tetra alcoholates of ethyl, propyl, isopropyl, butyl, iso-octyl and phenyl.

15. The process according to claim 13, which comprises tin compounds selected from the group consisting of dibutyl tin dilaurate, di-butyl tin octoate and tin oxalate.

16. The process according to claim 1, wherein the quantity of said catalyst used, referring to the metal which forms the active center, is from 1 to 1000 mg/kg of diol.

17. The process according to claim 1, wherein the quantity of said catalyst, referring to the metal which forms the active center, used is from 5 to 100 mg/kg of diol.

18. The process according to claim 1, wherein step (a) comprises:

(a') carrying out a first phase in which the transesterification reaction is at a temperature from 150 to 200° C., for a time from 1 to 12 hours, under boiling conditions at the operating pressure, eliminating from the reaction mixture the corresponding alcohol R—OH co-produced by the transesterification reaction, as it is formed; and carrying out a second phase in which the system is subjected to a progressive pressure reduction;

(a") to a value from 1 to 200 mbars, for a time from 1 to 20 hours.

19. The process according to claim 18, wherein the temperature is from 180 to 195° C.

20. The process according to claim 18, wherein in phase (all) the pressure of the system is reduced within values from 1 to 100 mbars and the time is from 3 to 10 hours.

21. The process according to claim 18, wherein phase (a') is carried out batchwise or in semicontinuous.

22. The process according to claim 1, wherein step (b) comprises:

(b') carrying out a first phase in which the transesterification reaction is carried out at a temperature from 120 to 150° C., at atmospheric pressure and for a time from 1 to 10 hours; and (b") carrying out a second phase in which the system is subjected to progressive pressure reduction within values ranging from 1 to 200 mbars, for a time from 1 to 10 hours, eliminating the ArOH alcohol co-produced in the reaction.

23. The process according to claim 22, wherein phase (b') is carried out at a temperature from 130 to 140° C. and for a time from 2 to 4 hours.

24. The process according to claim 22, wherein in phase (b") the pressure of the system is reduced within values from 1 to 100 mbars and the time is from 3 to 10 hours.

25. The process according to claim 22, wherein phase (b') is carried out batchwise.

26. The process of claim 12, wherein in step (a) the transesterification catalyst is selected from the group consisting of compounds of titanium, zirconium and tin.

27. The process of claim 1, wherein said polycarbonate diol of formula (I) has a number average molecular weight from 2500 to 5000.

* * * * *

UNITED STATES PATENT AND TRADEMARK OFFICE
CERTIFICATE OF CORRECTION

PATENT NO. : 6,384,178 B2
DATED : May 7, 2002
INVENTOR(S) : Mizia et al.

It is certified that error appears in the above-identified patent and that said Letters Patent is hereby corrected as shown below:

<u>Title page,</u>
Item [30], should read as follows:

-- [30]   Foreign Application Priority Data
   Mar. 17, 2000 (IT) -------------------------------------- MI2000 A 000549 --

Signed and Sealed this

Twenty-second Day of October, 2002

Attest:

JAMES E. ROGAN
Attesting Officer          Director of the United States Patent and Trademark Office